United States Patent
Friar et al.

(10) Patent No.: US 10,446,000 B2
(45) Date of Patent: Oct. 15, 2019

(54) DETECTING AN INTRUDER'S WIRELESS DEVICE DURING A BREAK IN TO A PREMISES

(71) Applicant: The ADT Security Corporation

(72) Inventors: Gary Friar, Saint Cloud, FL (US); Tim Rader, Lake Worth, FL (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 15/903,504

(22) Filed: Feb. 23, 2018

(65) Prior Publication Data
US 2018/0247508 A1    Aug. 30, 2018

Related U.S. Application Data

(60) Provisional application No. 62/463,236, filed on Feb. 24, 2017.

(51) Int. Cl.
| | |
|---|---|
| *G08B 13/24* | (2006.01) |
| *G08B 25/10* | (2006.01) |
| *G08B 13/189* | (2006.01) |
| *H04W 12/08* | (2009.01) |
| *G08B 25/08* | (2006.01) |
| *G08B 25/14* | (2006.01) |

(52) U.S. Cl.
CPC ........... *G08B 13/24* (2013.01); *G08B 13/189* (2013.01); *G08B 25/08* (2013.01); *G08B 25/10* (2013.01); *G08B 25/14* (2013.01); *H04W 12/08* (2013.01)

(58) Field of Classification Search
CPC ........ G08B 13/19695; G08B 13/19602; G08B 13/19606; G08B 13/19682; G08B 13/24; G08B 13/189

USPC .......................................................... 340/541
See application file for complete search history.

(56) References Cited

U.S. PATENT DOCUMENTS

| | | | |
|---|---|---|---|
| 9,166,732 B2 * | 10/2015 | Causey | H04K 3/65 |
| 2007/0140494 A1 | 6/2007 | Kumoluyi et al. | |
| 2010/0097214 A1 * | 4/2010 | Sweeney | G07C 9/00111 340/545.1 |

(Continued)

FOREIGN PATENT DOCUMENTS

WO    2015161387 A1    10/2015

OTHER PUBLICATIONS

International Search Report and Written Opinion dated May 15, 2018 for International Application No. PCT/US2018/19413 filed on Feb. 23, 2018, consisting of 6-pages.

*Primary Examiner* — Emily C Terrell
(74) *Attorney, Agent, or Firm* — Christopher & Weisberg, P.A.

(57) ABSTRACT

A control device and method for monitoring a premises are provided. The control device is in communication with a plurality of premises devices. The control device includes processing circuitry configured to: receive premises data from at least one of the plurality of premises device and determine whether the premises data meet an alarm condition. The processing circuitry is further configured to, if the premises data meets an alarm condition: monitor for identification data from a wireless device not associated with the control device, receive identification data from the wireless device and perform at least one detection function based on the identification data.

19 Claims, 3 Drawing Sheets

(56) References Cited

U.S. PATENT DOCUMENTS

| | | | |
|---|---|---|---|
| 2012/0092158 A1* | 4/2012 | Kumbhar | G08B 15/00 340/539.13 |
| 2013/0222598 A1* | 8/2013 | Tomar | H04W 4/203 348/158 |
| 2014/0278086 A1* | 9/2014 | San Filippo | G01C 21/3423 701/527 |
| 2016/0189510 A1 | 6/2016 | Hutz | |
| 2016/0210832 A1* | 7/2016 | Williams | H04W 4/043 |
| 2016/0284186 A1 | 9/2016 | Pavlich | |

* cited by examiner

DETECTING AN INTRUDER'S WIRELESS DEVICE DURING A BREAK IN TO A PREMISES

CROSS-REFERENCE TO RELATED APPLICATION

This application is related to and claims priority to U.S. Provisional Patent Application Ser. No. 62/463,236, filed Feb. 24, 2017, entitled "DETERMINING A CRIMINAL DURING AND AFTER A BREAK IN," the entirety of which is incorporated herein by reference.

TECHNICAL FIELD

This disclosure relates to a method, device and system for a premises system, and in particular to detection of an intruder's wireless device at a premises.

BACKGROUND

The demand for systems that monitor homes and businesses, i.e., premises, for alarm conditions has continued to grow as more home and business owners seek to protect their premises from various hazards and threats. Examples include intrusion, fire, carbon monoxide and flooding, among others dangers that may be monitored and reported to a monitoring station. When a life safety sensor such as a motion detector is triggered, a representative at a remote monitoring center receives an alarm event code and initiates a response process, including contacting a homeowner or others on a contact list and/or first responders such as local firefighters and/or police to request a dispatch to investigate the event at the premises being monitored. These systems further extend into the home automation field by monitoring and controlling home automation based devices, e.g., lifestyle devices, in and around a premises. Examples include monitoring and/or controlling a thermostat, lighting, appliances, etc.

However, when an intruder triggers the system by, for example, triggering a door sensor, there is typically limited information that can be obtained from the intruder that will allow first responders to subsequently capture the intruder. For example, existing systems are limited to capturing images, video and/or sounds of the intruder as the intruder ransacks the premises for valuables. While useful, these mechanisms may be further limited as an intruder can try to counteract or limit usefulness of these mechanisms by wearing a disguise, covering up his/her face, whispering, not talking, etc.

SUMMARY

Some embodiments advantageously provide a method, device and system for intrusion detection, and in particular to detection of an intruder's wireless device.

According to one aspect, a control device for monitoring a premises is provided. The control device is configured to communicate with a plurality of premises devices. The control device includes processing circuitry configured to: receive premises data from at least one of the plurality of premises device and determine whether the premises data meet an alarm condition. The processing circuitry is further configured, if the premises data meets an alarm condition: monitor for identification data from a wireless device; receive identification data from the wireless device, the wireless device being different from the plurality of premises devices; and perform at least one detection function based on the identification data.

According to one embodiment of this aspect, the processing circuitry is further configured to transmit a query message to the wireless device, the query message causing the wireless device to transmit the identification data to the control device for reception. According to one embodiment of this aspect, the at least one detection function includes determining at least one attribute of the wireless device based on the identification data.

According to one embodiment of this aspect, the at least one attribute of the wireless device includes a phone number, media access control (MAC) address, international mobile equipment identity (IMEI), wireless protocol identifier and device identifier. According to one embodiment of this aspect, the at least one detection function includes transmitting a notification message to a cellular service provider, the notification message configured to instruct the service provider to track the location of the wireless device.

According to one embodiment of this aspect, the tracked location of the wireless device is a global positing system (GPS) location. According to one embodiment of this aspect, the at least one detection function includes pushing detection information to the mobile phone, the detection information including a time and date the wireless device was at the premises after the premises data met the alarm condition. According to one embodiment of this aspect, the pushed detection information is configured to be stored at the mobile phone for a predetermined period of time.

According to one embodiment of this aspect, the received identification data from the wireless device is at least part of communications between the wireless device and a base station associated with the wireless device. According to one embodiment of this aspect, the premises data indicates the at least one premises device has been triggered, the at least one premises device including at least one of a door sensor, window sensor, fire sensor and smoke sensor.

Another aspect provides a method for monitoring a premises. Premises data is received from at least one of a plurality of premises devices. A determination is made as to whether the premises data meets an alarm condition. If the premises data meets an alarm condition:
  identification data from a wireless device is monitored;
  identification data from the wireless device is received, the wireless device being different from the plurality of premises devices; and
  at least one detection function is performed based on the identification data.

One embodiment of this aspect further includes transmitting a query message to the wireless device, the query message causing the wireless device to transmit the identification data to the control device for reception. In another embodiment of this aspect, the at least one detection function includes determining at least one attribute of the wireless device based on the identification data. In another embodiment of this aspect, the at least one attribute of the wireless device includes a phone number, media access control (MAC) address, international mobile equipment identity (IMEI), wireless protocol identifier and device identifier.

In another embodiment of this aspect, the at least one detection function includes transmitting a notification message to a cellular service provider, the notification message configured to instruct the service provider to track the location of the wireless device. In still another embodiment of this aspect, the tracked location of the wireless device is a global positing system (GPS) location.

In another embodiment of this aspect, the at least one detection function includes pushing detection information to the mobile phone, the detection information including a time and date the wireless device was at the premises after the premises data met the alarm condition. In another embodiment of this aspect, the pushed detection information is configured to be stored at the mobile phone for a predetermined period of time. In yet another embodiment of this aspect, the received identification data from the wireless device is at least part of communications between the wireless device and a base station associated with the wireless device. In another embodiment of this aspect, the premises data indicates the at least one premises device has been triggered, the at least one premises device including at least one of a door sensor, window sensor, fire sensor and smoke sensor.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
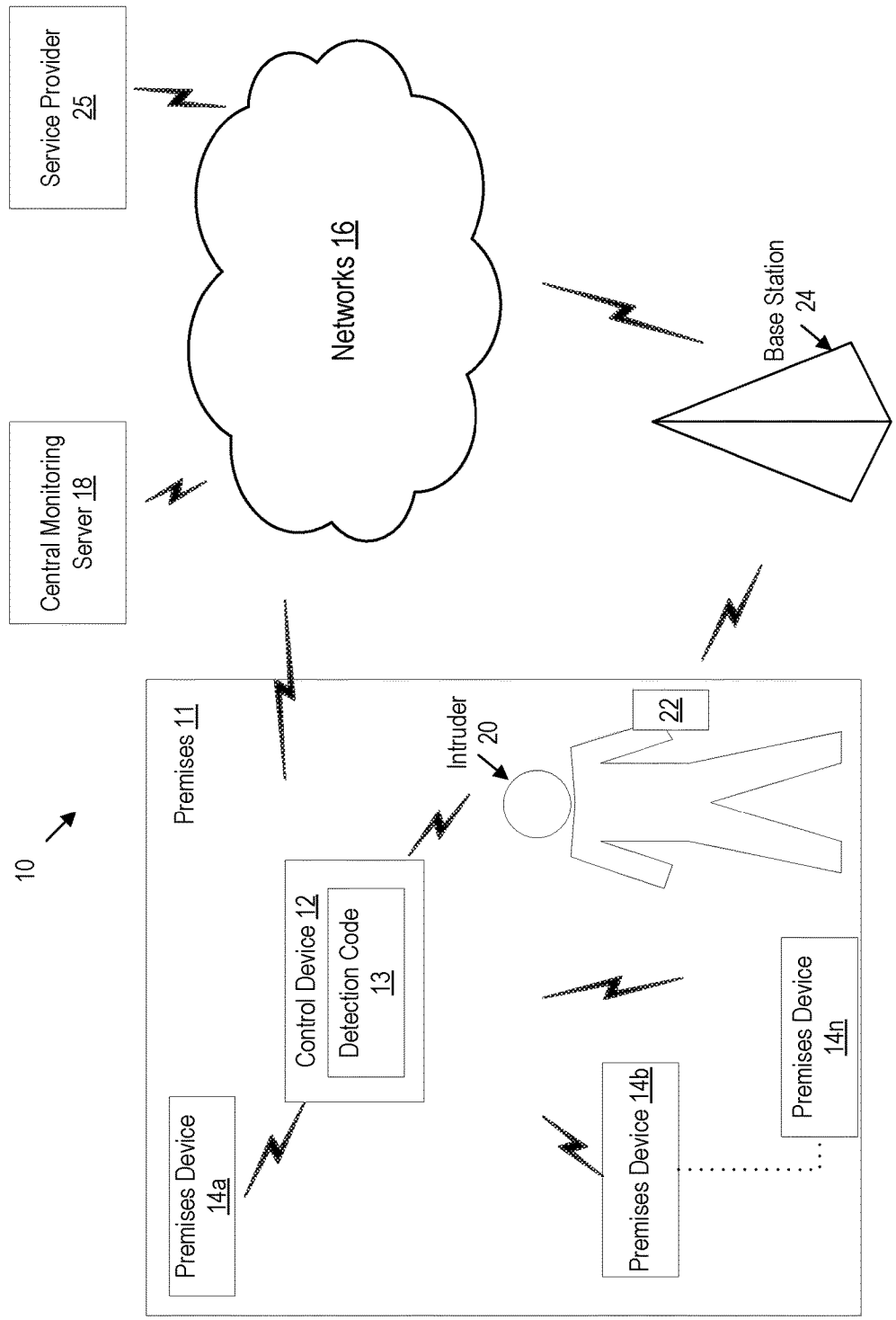
FIG. 1 is a block diagram of an exemplary detection system in accordance with principles of the invention.

Most people today carry a wireless device such as a cell phone with them wherever they go. In particular, an intruder such as a poorly skilled one is likely to have their cell phone on their person and active when committing a crime such as breaking into a premises. Existing premises systems do not take advantage of the information that may be available for possibly identifying the intruder based on information available from the cell phone using, for example, standard communication protocols.

The instant disclosure solves the problems with existing systems by providing a method, system and device for detecting wireless devices, i.e., an intruder's wireless device, in, on, and/or around the premises in order to collect identification data from the detected wireless device. In one or more embodiments, the system triggers detection of any wireless device in, on and/or around the premises in response to an alarm event. Embodiments therefore allow law enforcement and other authorities to identify the intruder based on the intruder's wireless device.

Before describing in detail exemplary embodiments that are in accordance with the disclosure, it is noted that the embodiments reside primarily in combinations of system/device components and processing steps related to detecting wireless devices at a premises in response to an alarm event. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 an exemplary system for performing wireless device detection in accordance with the principles of the disclosure and designated generally as "10." System 10 allows monitoring of a premises 11 and includes control device 12 and one or more premises devices (collectively referred to as "premises device 14") located in and/or around premises 11. Control device 12 is in communication with premises device 14 for receiving premises data from premises device 14. Control device 12 includes detection code 13 for performing wireless device detection process described herein with respect to FIG. 3.

Premise devices 14 may include one or more types of sensors, control and/or image capture devices. For example, the types of sensors may include various life safety related sensors such as motion sensors, fire sensors, smoke sensors, carbon monoxide sensors, flooding sensors and contact sensors, among other sensor types that are known in the art. The control devices 12 may include, for example, one or more life style related devices configured to adjust at least one premises setting such as lighting, temperature, energy usage, door lock and power settings, among other settings associated with the premise or devices on the premise. Image capture devices may include a digital camera and/or video camera, among other image captures devices that are well known in the art. Premises device 14 may communicate with control device 12 via proprietary wireless communication protocols and/or known communication protocols such as Wi-Fi, BLUETOOTH, etc. Those of ordinary skill in the art will also appreciate that various additional sensors and control and/or image capture devices may relate to life safety or life style depending on both what the sensors, control and image capture devices do and how these sensors, control and image devices are used by system 10. System 10 provides the ability to use any of these devices irrespective of whether they are life safety or life style. Control device 12 is configured to communicate, over one or more networks 16, with central monitoring server 18 for reporting various information and/or alerts, among other messages, notifications and data discussed herein. In one embodiment, network 16 can be the Internet. Network 16 can also be a virtual private network or intranet configured to facilitate communications using a known communication protocol such as TCP/IP. In one or more embodiments, control device 12 may be configured to communicate with one or more devices using cellular protocols such as $3^{rd}$ Generation Partnership Protocols (3GPP), Long Term Evolution (LTE) and/or New Radio (NR) based protocols.

Figure 3:
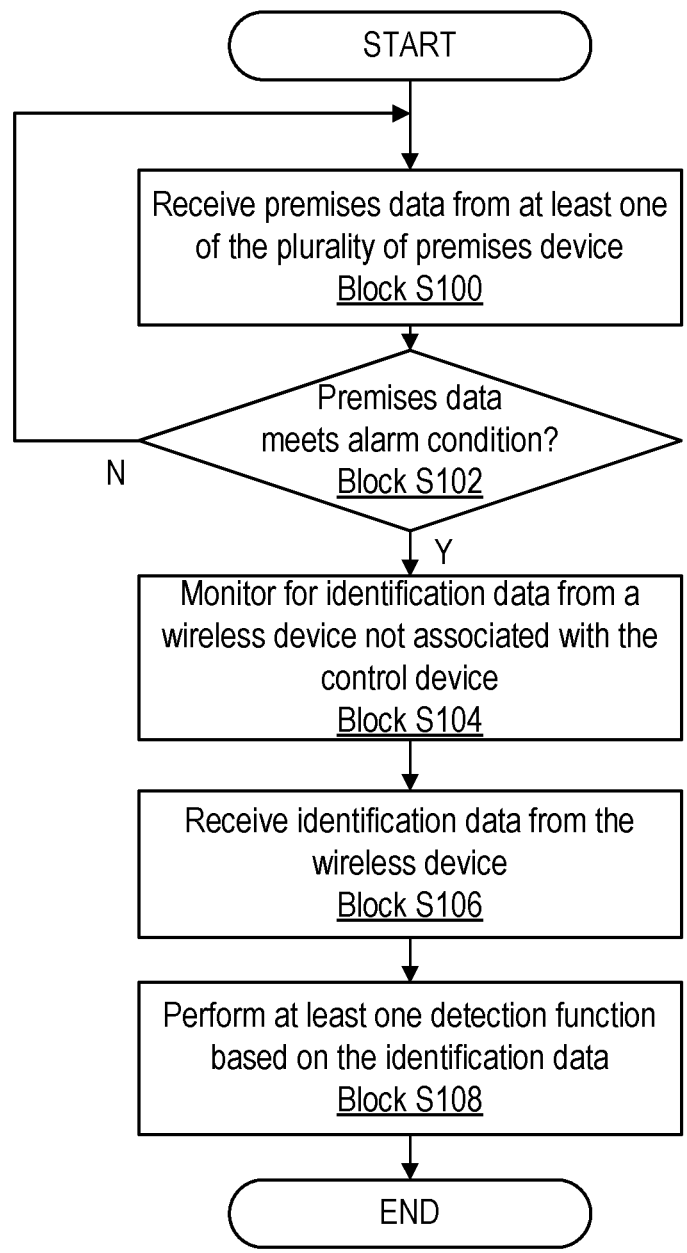
FIG. 3 is a flow diagram of an exemplary detection process in accordance with the principles of the invention.

As illustrated in the example of FIG. 1, intruder 20 is located within premises 11 and is carrying wireless device 22 associated with intruder 20 and different from premises device 14. In particular, wireless device 22 may be a radio communication device, device-to-device wireless device, user equipment (UE), machine type mobile device or wireless device capable of machine to machine communication, tablet, mobile terminal, mobile telephone, laptop, automobile, smart phone, laptop embedded equipped (LEE), laptop mounted equipment (LME), USB dongle, among other devices that can communicate radio or wireless signals as are known in the art. Wireless device 22 is configured to communicate with one or more base stations 24, one or more other wireless device 22 and/or other devices via communication protocols known in the art such as cellular protocols (e.g., 3GPP based, NR based protocols and/or LTE based protocols) and/or local communication protocols (e.g., WiFi, BLUETOOTH). In one or more embodiments, wireless device 22 is serviced by service provider 25 via base station 24. In other words, wireless device 22 is not part of the premises system that includes control device 12 and premises devices 14, i.e., wireless device 22 is not associated with control device 12 and/or premises devices 14 where control device 12 and premises device 14 correspond to the premises system. In one or more embodiments described herein, control device 12 initiates communication with wireless device 22 in response to a determination that an alert condition is met, as described herein. While intruder 20 is illustrated within premises 11, one or more embodiments described herein are equally applicable to the detection of intruder 20 near premises 11, before intrusion into premises 11, such that the detection process described with respect to FIG. 3 is performed when the alarm condition is a preventive alarm condition. In other words, wireless device 22 and its corresponding device information may be collected by control device 12 before, after and/or during the determination that an alert condition is met.

Figure 2:
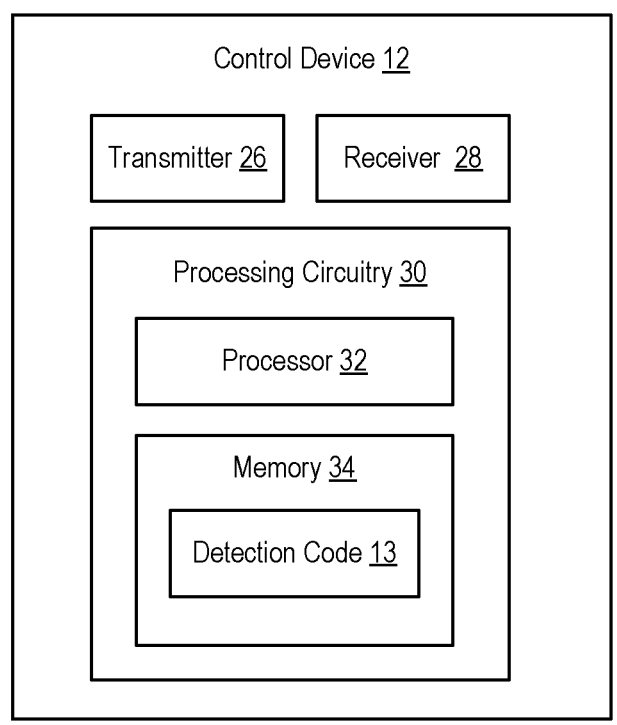
FIG. 2 is a block diagram of a control device in accordance with the principles of the invention.

FIG. 2 is a block diagram of an exemplary control device 12 in accordance with the principles of the invention. In one or more embodiments, control device 12 is a security control device and/or panel for monitoring premises 11 using premises devices 14. Control device 12 includes one or more transmitters 26 and one or more receivers 28 for communicating with premises device 14, network 16, wireless device 22 and other devices within wireless communication range of control device 12 that support at least one communication protocol implemented by control device 12. In one or more embodiments, transmitter 26 and/or receiver 28 include one or more communication interfaces for communicating with premises device 14, network 16, wireless device 22 and other devices within wireless communication range of control device 12 that support at least one communication protocol implemented by control device 12.

Control device 12 includes processing circuitry 30. In some embodiments, the processing circuitry 30 may include a processor 32 and memory 34, memory 34 containing instructions which, when executed by processor 32, configure processor 32 to perform the one or more functions described herein such as the process described with respect to FIG. 3. In addition to a traditional processor, e.g., CPU, and memory, processing circuitry 30 may comprise integrated circuitry for processing and/or control, e.g., one or more processors and/or processor cores and/or FPGAs (Field Programmable Gate Array) and/or ASICs (Application Specific Integrated Circuitry).

Processing circuitry 30 may comprise and/or be connected to and/or be configured for accessing (e.g., writing to and/or reading from) memory 34, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 34 may be configured to store code executable by control circuitry and/or other data, e.g., data pertaining to communication, alarm conditions, etc. Processing circuitry 30 may be configured to control any of the methods described herein and/or to cause such methods to be performed, e.g., by processor 32.

Corresponding instructions may be stored in the memory 34, which may be readable and/or readably connected to the processing circuitry 30. In other words, processing circuitry 30 may include a controller, which may comprise a microprocessor and/or microcontroller and/or FPGA (Field-Programmable Gate Array) device and/or ASIC (Application Specific Integrated Circuit) device. It may be considered that processing circuitry 30 includes or may be connected or connectable to memory, which may be configured to be accessible for reading and/or writing by the controller and/or processing circuitry 30. Memory 34 is configured to store detection code 13 for performing the detection functions described herein such as those functions described in detail with respect to FIG. 3. In one or more embodiments, memory 34 is further configured to store predefined alarm conditions and other data for related to premises 11 monitoring.

FIG. 3 is a flow diagram of an exemplary detection process performed by detection code 13 in accordance with the principles of the invention. Processing circuitry 30 is configured to receive premises data from at least one of the plurality of premises device 14 (Block S100). The premises data may indicate that that one or more sensors have been triggered. Processing circuitry 30 determines whether the premises data meets an alarm condition, i.e., at least one alarm condition (Block S102). For example, control device 12 may store one or more predefined alarm conditions in memory 34 in which processing circuitry 30 may determine whether the received premises data meets one or more of the alarm conditions. For example, a premises device 14 such as a door sensor, window sensor or motion sensor may be triggered, thereby generating premises data for indicating the detection to control device 12. Control device 12 may analyze the premises data from premises device 14 to determine whether an alarm condition is met. Various types of alarm conditions such as thresholds are known in the art and will not be further described herein.

If processing circuitry 30 determines that premises data does not meet one or more alarm conditions, processing circuitry 30 may continue to perform the determination of Block S100. If processing circuitry 30 determines premises data meets one or more alarm conditions, processing circuitry 30 monitors for identification data from wireless device 22 (Block S104). For example, in one or more embodiments, identification data may include at least one of a BLUETOOTH identification, wireless protocol identifier, phone number, media access control (MAC) address, international mobile equipment identity (IMEI), and device identifier. In one or more embodiments, processing circuitry 30 may cause transmission of a query message to wireless device 22 in which the query message may be configured to cause wireless device 22 to transmit the identification data to control device 12 for reception by control device 12, hence, processing circuitry 30 monitors for the response of wireless device 22 from the query message. In one or more other embodiments, processing circuitry 30 may monitor for identification data that includes at least part of communications between wireless device 22 and base station 24 such that control device 12 is able to receive and process basic wireless communication packets that were not intended for control device 12 in order to determine identification data. In one or more embodiments, the communication between wireless device 22 and base station 24 may occur using wireless communication packets based on cellular protocols such as 3GPP, LTE and/or New Radio (NR) based protocols, which control device 12 may be configured to receive and process.

Processing circuitry 30 receives identification data from wireless device 22 such as identification data described above (Block S106). Processing circuitry 30 performs at least one detection function based on the identification data (Block S108). In one or more embodiments, the at least one detection function may include determining at least one attribute of wireless device 22 based on the identification data. For example, the at least one attribute of wireless device 22 may include at least one of a phone number, media access control (MAC) address, international mobile equipment identity (IMEI), wireless protocol identifier and device identifier. The attribute can be used to identify the owner of the wireless device 22 through records such as those of the cellular service provider that provides service to the wireless device 22. In one or more embodiments, wireless device 22 and its corresponding device information may be collected by control device 12 before, after and/or during the determination that an alert condition is met.

In one or more other embodiments, the at least one detection function may include transmitting a notification message to a cellular service provider or first responder such as a law enforcement agency. The notification message may be configured to instruct the service provider or first responder to track the location of wireless device 22. For example, the alarm service provider may have a predefined agreement with service provider 25, e.g., cellular service provider, such that control device 12 is able to transmit notification messages directly to service provider 25 or via central monitoring server 18 to initiate tracking of wireless device 22. In one or more embodiments, the tracked location of wireless device 22 is a global positing system (GPS) location.

In one or more embodiments, the at least one detection function may include electronically pushing detection information and/or program code to wireless device 22. For example, the detection information includes a time and date that wireless device 22 was at the premises after the premises data met the alarm condition such that wireless device 22 will at least temporarily store detection information that can be used by first responders or other entities to verify the intruder was unlawfully at premises 11. The program code that is pushed to wireless device 22 may be configured to cause wireless device 22 to perform a specific action such as initiating wireless device 22 image and/or video capture using components of wireless device 22, transmitting a message to emergency responders where the message may include information such the premises' address/wireless device 22 location (e.g., GPS location) and an indication that a crime is occurring at this location, among other actions that may be performed by wireless device 22. In one or more embodiments, the pushed detection information is configured to be stored at wireless device 22 for a predetermined period of time.

As will be appreciated by one of skill in the art, the concepts described herein may be embodied as a method, control device, apparatus and device. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a non-transitory tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby form a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A control device for monitoring a premises, the control device being configured to communicate with a plurality of premises devices, the control device comprising:
    processing circuitry configured to:
        receive premises data from at least one of the plurality of premises devices;
        determine whether the premises data meets an alarm condition;
        if the premises data meets an alarm condition:
            monitor for identification data associated with the wireless device;
            intercept communications between the wireless device and a base station, the communications including the identification data associated with the wireless device; and
            perform at least one detection function based on the identification data, the at least one detection function comprising electronically pushing detection information to the wireless device, the detection information including a time and date the wireless device was at the premises after the premises data met the alarm condition.

2. The control device of claim 1, wherein the processing circuitry is further configured to transmit a query message to the wireless device, the query message causing the wireless device to transmit the identification data to the control device.

3. The control device of claim 1, wherein the at least one detection function includes determining at least one attribute of the wireless device based on the identification data.

4. The control device of claim 3, wherein the at least one attribute of the wireless device includes at least one of a phone number, media access control (MAC) address, international mobile equipment identity (IMEI), wireless protocol identifier and device identifier.

5. The control device of claim 1, wherein the at least one detection function includes transmitting a notification message to a cellular service provider, the notification message configured to instruct the cellular service provider to track the location of the wireless device.

6. The control device of claim 5, wherein the tracked location of the wireless device is a global positing system (GPS) location.

7. The control device of claim 1, wherein the pushed detection information is configured to be stored at the wireless device for a predetermined period of time.

8. The control device of claim 1, wherein the received identification data from the wireless device includes at least part of communications between the wireless device and a base station associated with the wireless device.

9. The control device of claim 1, wherein the premises data indicates the at least one premises device has been triggered, the at least one premises device including at least one of a door sensor, window sensor, fire sensor and smoke sensor.

10. A method for monitoring a premises, the method comprising:
    receiving premises data from at least one of a plurality of premises device;
    determining whether the premises data meets an alarm condition;
    if the premises data meets an alarm condition:
        monitoring for identification data associated with the wireless device;
        intercepting communications between the wireless device and a base station, the communications including the identification data associated with the wireless device, the wireless device being different from the plurality of premises devices; and
        performing at least one detection function based on the identification data, the at least one detection function comprising electronically pushing detection information to the wireless device, the detection information including a time and date the wireless device was at the premises after the premises data met the alarm condition.

11. The method of claim 10, further comprising transmitting a query message to the wireless device, the query message causing the wireless device to transmit the identification data to the control device for reception.

12. The method of claim 10, wherein the at least one detection function includes determining at least one attribute of the wireless device based on the identification data.

13. The method of claim 12, wherein the at least one attribute of the wireless device includes a phone number, media access control (MAC) address, international mobile equipment identity (IMEI), wireless protocol identifier and device identifier.

14. The method of claim 10, wherein the at least one detection function includes transmitting a notification message to a cellular service provider, the notification message configured to instruct the service provider to track the location of the wireless device.

15. The method of claim 14, wherein the tracked location of the wireless device is a global positing system (GPS) location.

16. The method of claim 10, wherein the pushed detection information is configured to be stored at the wireless device for a predetermined period of time.

17. The method of claim 10, wherein the received identification data from the wireless device includes at least part of communications between the wireless device and a base station associated with the wireless device.

18. The method of claim 10, wherein the premises data indicates the at least one premises device has been triggered, the at least one premises device including at least one of a door sensor, window sensor, fire sensor and smoke sensor.

19. A control device for monitoring a premises, the control device being configured to communicate with a plurality of premises devices, the control device comprising:
   processing circuitry configured to:
      receive premises data from at least one of the plurality of premises devices;
      determine whether the premises data meets an alarm condition; and
      if the premises data meets an alarm condition:
         intercept communications between the wireless device and a base station, the communications including identification data associated with the wireless device; and
         electronically push detection information to the wireless device, the detection information including a time and date the wireless device was at the premises after the premises data met the alarm condition.

\* \* \* \* \*